(12) United States Patent
Scherich et al.

(10) Patent No.: US 12,434,041 B2
(45) Date of Patent: Oct. 7, 2025

(54) INSTRUMENT ADVANCEMENT DEVICE HAVING AN ANTI-BUCKLING FEATURE

(71) Applicant: Becton, Dickinson and Company, Franklin Lakes, NJ (US)

(72) Inventors: Megan Scherich, Salt Lake City, UT (US); Weston F. Harding, Lehi, UT (US); Justin G. Hortin, Farmington, UT (US); Jonathan Karl Burkholz, Salt Lake City, UT (US); Bart D. Peterson, Farmington, UT (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 723 days.

(21) Appl. No.: 17/709,980

(22) Filed: Mar. 31, 2022

(65) Prior Publication Data

US 2022/0323737 A1    Oct. 13, 2022

Related U.S. Application Data

(60) Provisional application No. 63/170,389, filed on Apr. 2, 2021.

(51) Int. Cl.
*A61M 39/02* (2006.01)
*A61M 25/00* (2006.01)
*A61M 39/10* (2006.01)

(52) U.S. Cl.
CPC ..... *A61M 39/0247* (2013.01); *A61M 25/0097* (2013.01); *A61M 2039/0258* (2013.01);
(Continued)

(58) Field of Classification Search
CPC ........ A61M 25/09041; A61M 25/0113; A61M 2039/0279; A61M 2025/0058;
(Continued)

(56) References Cited

U.S. PATENT DOCUMENTS

| 7,699,809 | B2 * | 4/2010 | Urmey | A61M 25/0606 |
| | | | | 607/116 |
| 2004/0045561 | A1 | 3/2004 | Alexander et al. | |

(Continued)

FOREIGN PATENT DOCUMENTS

WO    2023278499 A1    1/2023

*Primary Examiner* — Michael J Tsai
*Assistant Examiner* — Katerina A. Wittliff
(74) *Attorney, Agent, or Firm* — The Webb Law Firm

(57) ABSTRACT

An instrument advancement device may include a housing and an extension tube extending through the housing. A wedge may be disposed within the housing. The wedge may include an arc-shaped channel. A pair of opposing pinch members configured to pinch the extension tube may be disposed within the housing and configured to move along the extension tube. An instrument may extend through the arc-shaped channel. A first end of the instrument may be fixed. In response to moving the housing distally along the extension tube, the pair of opposing pinch members may push the wedge distally. In response to movement of the wedge distally a first distance, a second end of the instrument may be configured to advance distally a second distance. A support element or compressible element may be disposed within a lumen of the extension tube to support the instrument.

20 Claims, 17 Drawing Sheets

(52) U.S. Cl.
CPC ........... *A61M 2039/0279* (2013.01); *A61M 2039/0294* (2013.01); *A61M 2039/1077* (2013.01)

(58) Field of Classification Search
CPC ...... A61M 2025/0059; A61M 25/0147; A61M 25/0105; A61M 2025/015; A61M 25/0097; A61M 39/1011; A61M 2025/09125; A61M 2039/1072; A61B 2017/00469
See application file for complete search history.

(56) References Cited

U.S. PATENT DOCUMENTS

| | | | |
|---|---|---|---|
| 2016/0067450 A1* | 3/2016 | Kowshik | A61M 25/0147 604/95.04 |
| 2017/0020555 A1 | 1/2017 | Ferrera et al. | |
| 2017/0224986 A1 | 8/2017 | Imran et al. | |
| 2018/0272106 A1* | 9/2018 | Funk | A61B 5/15003 |
| 2018/0333560 A1* | 11/2018 | Milner | A61M 25/0136 |
| 2019/0117395 A1* | 4/2019 | Levi | A61F 2/95 |
| 2020/0246590 A1 | 8/2020 | Devgon et al. | |
| 2023/0001157 A1 | 1/2023 | Scherich et al. | |

\* cited by examiner

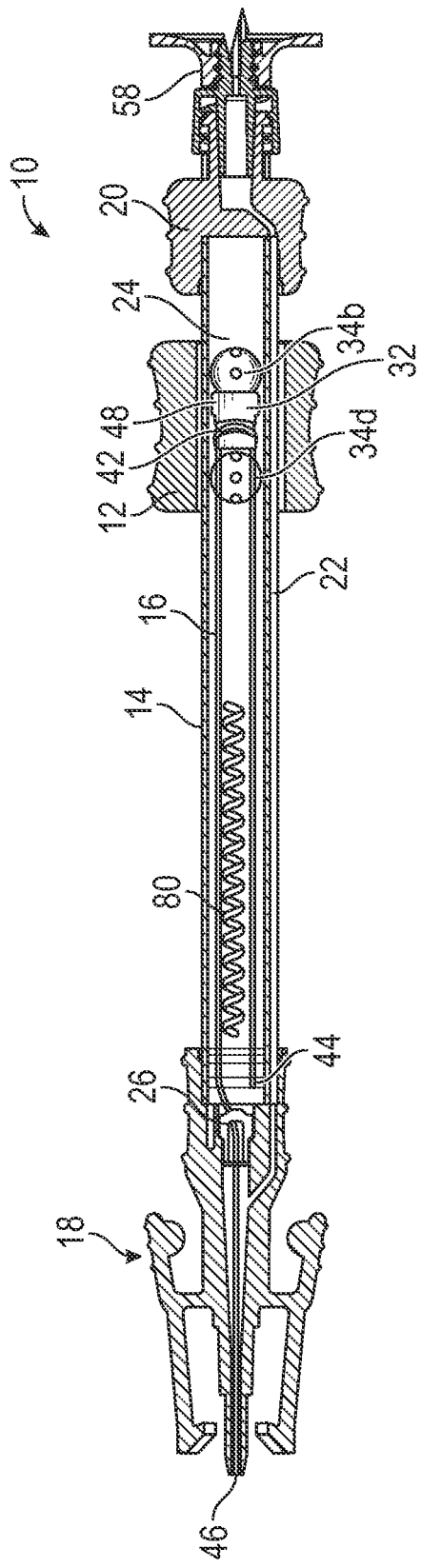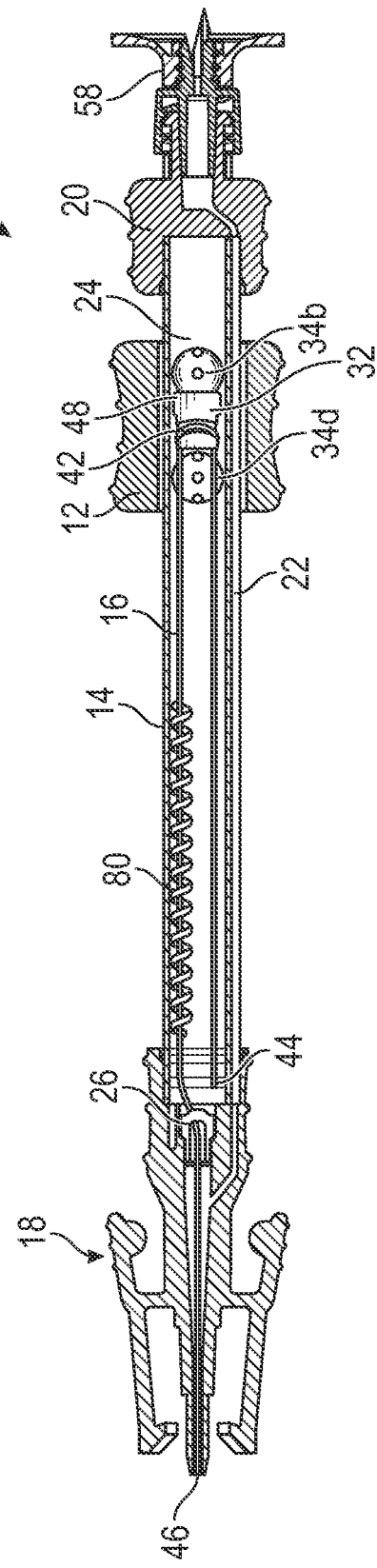
FIG. 9A
FIG. 9B

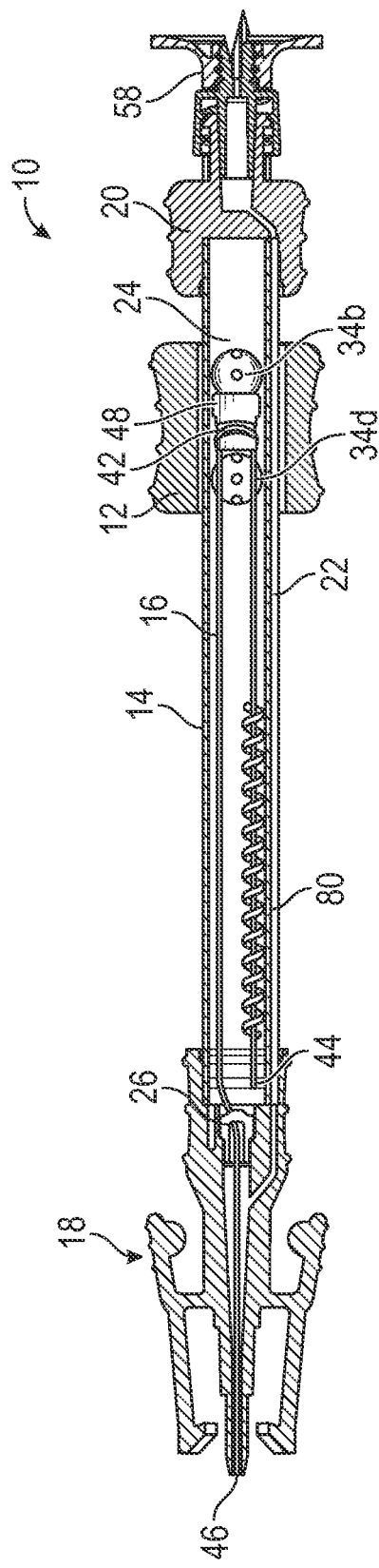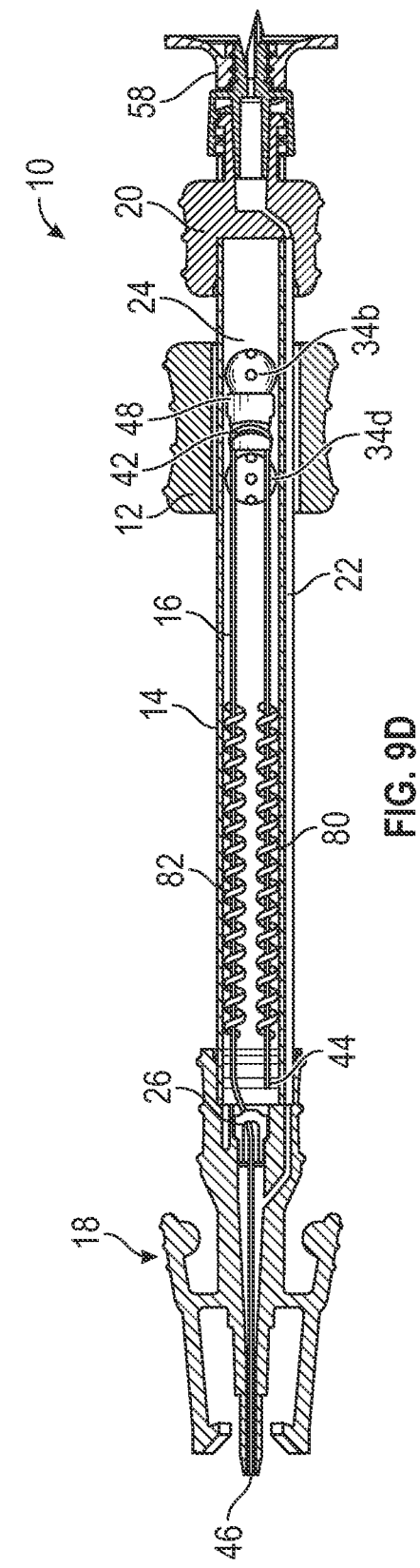

INSTRUMENT ADVANCEMENT DEVICE HAVING AN ANTI-BUCKLING FEATURE

CROSS-REFERENCE TO RELATED APPLICATION

The present application claims priority to U.S. Provisional Application No. 63/170,389, entitled "Instrument Advancement Device having an Anti-Buckling Feature", filed Apr. 2, 2021, the entire disclosure of which is hereby incorporated by reference in its entirety.

BACKGROUND OF THE INVENTION

Catheters are commonly used for a variety of infusion therapies. For example, catheters may be used for infusing fluids, such as normal saline solution, various medicaments, and total parenteral nutrition, into a patient. Catheters may also be used for withdrawing blood from the patient.

A common type of intravenous (IV) catheter device includes a catheter that is over-the-needle. As its name implies, the catheter that is over-the-needle may be mounted over an introducer needle having a sharp distal tip. The IV catheter device may include a catheter adapter, the catheter extending distally from the catheter adapter, and the introducer needle extending through the catheter. The catheter and the introducer needle may be assembled so that the distal tip of the introducer needle extends beyond the distal tip of the catheter with the bevel of the needle facing up away from skin of the patient. The catheter and introducer needle are generally inserted at a shallow angle through the skin into vasculature of the patient.

In order to verify proper placement of the introducer needle and/or the catheter in the blood vessel, a clinician generally confirms that there is "flashback" of blood in a flashback chamber of the catheter assembly. Once placement of the needle has been confirmed, the clinician may temporarily occlude flow in the vasculature and remove the needle, leaving the catheter in place for future blood withdrawal or fluid infusion.

Infusion and blood withdrawal using the catheter may be difficult for several reasons, particularly when an indwelling time of the catheter increases. A fibrin sheath or thrombus may form on an internal surface of the catheter assembly, an external surface of the catheter assembly, or within the vasculature near the distal tip of the catheter. The fibrin sheath or thrombus may block or narrow a fluid pathway through the catheter, which may impair infusion and/or collection of a high-quality blood sample.

The subject matter claimed herein is not limited to embodiments that solve any disadvantages or that operate only in environments such as those described above. Rather, this background is only provided to illustrate one example technology area where some implementations described herein may be practiced.

SUMMARY OF THE INVENTION

The present disclosure relates generally to instrument advancement devices to facilitate advancement and/or retraction of an instrument within an IV catheter, as well as related systems and methods. In some embodiments, an instrument advancement device may include a housing and an extension tube extending through the housing. In some embodiments, the instrument advancement device may include a wedge disposed within the housing. In some embodiments, the wedge may include an arc-shaped channel. In some embodiments, the instrument advancement device may include a pair of opposing pinch members configured to pinch the extension tube. In some embodiments, the pair of opposing pinch members may be disposed within the housing and configured to move along the extension tube with the housing.

In some embodiments, the instrument advancement device may include an instrument extending through the arc-shaped channel. In some embodiments, a first end of the instrument is fixed. In some embodiments, in response to moving the housing distally along the extension tube, the pair of opposing pinch members may push the wedge distally. In some embodiments, in response to movement of the wedge distally a first distance, a second end of the instrument may be configured to advance distally a second distance. In some embodiments, the second distance may be at least twice the first distance.

In some embodiments, a support element may be disposed within a lumen of the extension tube. In some embodiments, the instrument may extend through the support element. In some embodiments, the support element may include a first hole and a second hole. In some embodiments, the first end of the instrument may extend through the first hole. In some embodiments, the second end of the instrument may extend through the second hole.

In some embodiments, the instrument advancement device may include one or more other support elements may be disposed within the lumen of the extension tube. In some embodiments, the wedge or the extension tube may be configured to contact the support element and move the support element distally in response to movement of the wedge distally.

In some embodiments, the instrument advancement device may include a tether extending between the wedge and the support element. In some embodiments, the tether may be fixed to the wedge and/or the support element.

In some embodiments, the support element may include an aperture extending therethrough. In some embodiments, the tether may extend through the aperture, and the wedge may be configured to move without moving the support element. In some embodiments, the wedge may include another aperture extending therethrough, and the tether may extend through the other aperture. In some embodiments, a distal end of the tether may be distal to the support element and/or may include a catch. In some embodiments, a proximal end of the tether may be proximal to the wedge and/or may include another catch. In some embodiments, in response to retraction of the housing in a proximal direction, the catch is configured to pull the support element and/or the other support elements proximally. In these and other embodiments, the tether may extend through the other support elements and the distal end of the tether may be disposed distal to the other support elements.

In some embodiments, the pair of opposing pinch members may be disposed within the housing proximal to the wedge. In some embodiments, the instrument advancement device may include another pair of opposing pinch members configured to pinch the extension tube. In some embodiments, the other pair of opposing pinch members may be disposed within the housing distal to the wedge and configured to move along the extension tube with the housing. In some embodiments, in response to moving the housing proximally along the extension tube, the pair of opposing pinch members may push the wedge proximally and the instrument may be retracted proximally. In some embodiments, in response to movement of the housing along the extension tube, the pair of opposing pinch members and/or the other pair of opposing pinch members may rotate with respect to the housing and the extension tube.

In some embodiments, the extension tube may include a first lumen and a second lumen. In some embodiments, a blood collection pathway may extend through the first lumen. In some embodiments, the instrument advancement device and/or the extension tube may include multiple lumens for blood collection. In some embodiments, the wedge and the instrument may be disposed within the second lumen.

In some embodiments, the instrument advancement device may include a compressible element disposed within a lumen of the extension tube distal to the wedge. In some embodiments, in response to distal movement the wedge, the wedge may be configured to contact the compressible element to compress the compressible element. In some embodiments, the compressible element may include a spring. In some embodiments, the compressible element may be disposed between the first end of the instrument and the second end of the instrument. In some embodiments, the first end may extend through the compressible element. In some embodiments, the second end extends through the compressible element.

In some embodiments, the instrument advancement device may include another compressible element disposed within a lumen of the extension tube distal to the wedge. In some embodiments, the first end of the instrument may extend through the compressible element. In some embodiments, the second end of the instrument may extend through the other compressible element.

In some embodiments, the housing may include a first push tab and/or a second push tab. In some embodiments, the instrument advancement device may include a distal connector. In some embodiments, a distal end of the extension tube may be coupled to the distal connector. In some embodiments, the distal connector may include a central insertion feature and two lever arms disposed on opposite sides of the central insertion feature. In some embodiments, the central insertion feature may include a luer shape. In some embodiments, a proximal end of each of the two lever arms may include a stop protrusion.

In some embodiments, the advancement element may include a pocket. In some embodiments, the advancement element may be disposed within the lumen. In some embodiments, the catheter extension set may include a translation feature disposed between the handle and an outer surface of the housing and within the pocket such that in response to distal movement of the handle along the outer surface of the housing the first distance, the advancement element moves distally within the lumen the first distance, and the second end of the instrument advances distally the second distance.

It is to be understood that both the foregoing general description and the following detailed description are examples and explanatory and are not restrictive of the invention, as claimed. It should be understood that the various embodiments are not limited to the arrangements and instrumentality illustrated in the drawings. It should also be understood that the embodiments may be combined, or that other embodiments may be utilized and that structural changes, unless so claimed, may be made without departing from the scope of the various embodiments of the present invention. The following detailed description is, therefore, not to be taken in a limiting sense.

BRIEF DESCRIPTION OF THE DRAWINGS

Example embodiments will be described and explained with additional specificity and detail through the use of the accompanying drawings in which:

FIG. 9A is a cross-sectional view of the instrument advancement device, illustrating an example compressible element, according to some embodiments;

FIG. 9B is a cross-sectional view of the instrument advancement device, illustrating the compressible element, according to some embodiments;

FIG. 9C is a cross-sectional view of the instrument advancement device, illustrating the compressible element, according to some embodiments;

FIG. 9D is a cross-sectional view of the instrument advancement device, illustrating the compressible element and another example compressible element, according to some embodiments;

Figure 1:
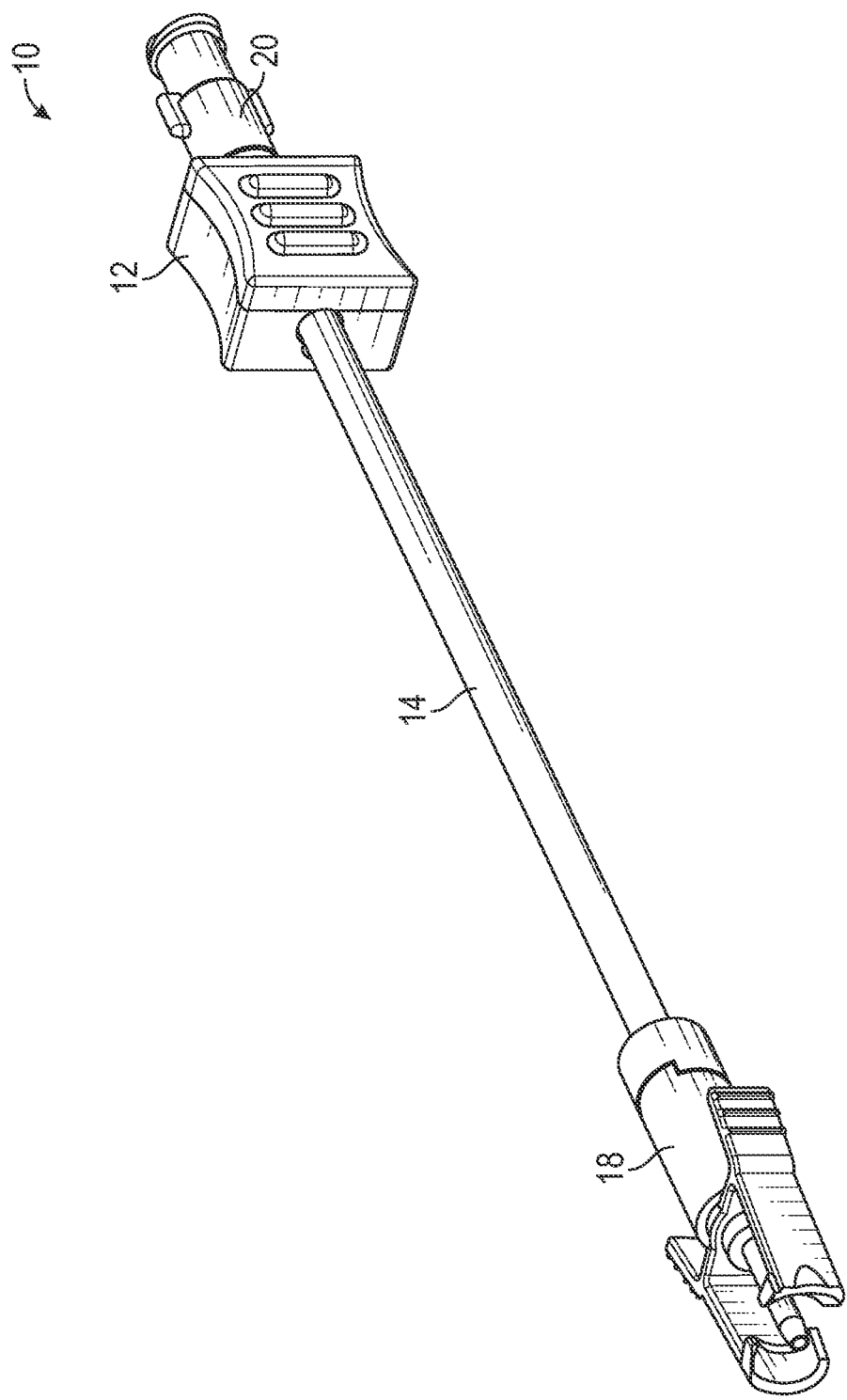
FIG. 1 is an upper perspective view of an example instrument advancement device, according to some embodiments.

DETAILED DESCRIPTION OF THE
EMBODIMENTS

Referring now to FIGS. 1-4, an instrument advancement device 10 is illustrated, according to some embodiments. In some embodiments, the instrument advancement device 10 may include a housing 12 and an extension tube 14 extending through the housing 12. In some embodiments, the extension tube 14 may be rigid, semi-rigid, or flexible. In some embodiments, the extension tube 14 may include a coextruded guidewire to add stiffness to the extension tube 14. In some embodiments, the extension tube 14 may include a multi-lumen extension tube. In some embodiments, the extension tube 14 may be transparent or opaque.

In some embodiments, the instrument advancement device 10 may include an instrument 16, which may include a guidewire, an instrument, a tube, or another suitable instrument another suitable instrument. In some embodiments, the instrument 16 may include one or more sensors. In some embodiments, the instrument 16 may be colored to increase visibility. In some embodiments, the guidewire may be constructed of metal or another suitable material. In these and other embodiments, the instrument 16 may be lubricated or coated to ease advancement. In some embodiments, the instrument that is the tube may be soft or stiff. In some embodiments, the tube may create a closed path for blood flow and/or reduce contamination of the blood due to drug adsorption in a catheter assembly.

In some embodiments, the instrument 16 may include the guidewire, which may include a spring or coil. In some embodiments, the spring or coil may include varying pitches along a length of the spring or coil. For example, a pitch of the spring or coil upstream from or proximal to a catheter tip may be larger to facilitate more blood flow and increase flow rate, and a pitch of the spring or coil near the catheter tip may be smaller to prevent blood clots from entering the catheter tip, while still allowing blood to flow through it. In some embodiments, the guidewire may include a rod, which may extend through a center portion of the spring or coil. In some embodiments, the guidewire may include the rod and may not include the spring or coil.

Over time a catheter can become occluded at the catheter tip due to presence of fibrin sheath, thrombus, or vein walls or valves. In some embodiments, the instrument 16 may be configured to extend into and/or through the catheter assembly to push through and/or disrupt an occlusion of the catheter. In some embodiments, the instrument 16 may overcome thrombus and fibrin sheath in or around the catheter assembly or in the vein that might otherwise prevent infusion or blood draw. In some embodiments, the instrument advancement device 10 may reduce trauma to the vasculature while also facilitating fluid delivery, blood collection, patient or device monitoring, or other clinical needs. In some embodiments, the instrument advancement device 10 may decrease hemolysis and reduce blood exposure. In some embodiments, the instrument 16 may include a vascular access instrument configured to advance distally through the catheter assembly and into the vasculature of the patient.

In some embodiments, a distal end of the instrument advancement device 10 may include a distal connector 18 or another suitable connector. In some embodiments, the distal connector 18 may be configured to couple to the catheter assembly, which may be existing or already dwelling within the vasculature of the patient when the distal connector 18 is coupled. In some embodiments, the catheter assembly may include a catheter adapter, which may include a distal end, a proximal end, and a lumen extending through the distal end of the catheter adapter and the proximal end of the catheter adapter. In some embodiments, the catheter may extend from the distal end of the catheter adapter. In some embodiments, the catheter may include a peripheral intravenous catheter, a midline catheter, or a peripherally inserted central catheter. In some embodiments, the catheter assembly may include an introducer needle, which may extend through the catheter and facilitate piercing of skin and the vasculature to insert the catheter into the patient. In some embodiments, the introducer needle may be removed from the catheter assembly prior to coupling of the instrument advancement device 10 to the catheter assembly.

In some embodiments, the catheter assembly may be straight. In other embodiments, the catheter assembly may be integrated, having an extension tube that is integrated with the catheter adapter. In some embodiments, the catheter assembly may include an extension set, which may include the extension tube extending from and integrated with a side port of the catheter adapter. In some embodiments, the distal connector 18 may be configured to couple to a portion of the catheter assembly, such as the proximal end of the catheter adapter and/or a needleless access connector. In some embodiments, the needleless access connector may be coupled to a proximal end, a T-connector, or another portion of the extension set. In some embodiments, the needleless access connector may be permanently connected, such as, for example, via adhesive, to the distal connector 18 to prevent intentional or unintentional removal by a user.

In some embodiments, a distal end of the extension tube 14 may be coupled to the distal connector 18. In some embodiments, a proximal end of the extension tube 14 may be coupled to a proximal connector 20. In some embodiments, the instrument 16 may be advanced prior to or during infusion or blood draw. In some embodiments, after completing a blood draw or infusion and before uncoupling the instrument advancement device 10 from the catheter assembly, the user may retract the instrument 16 by moving the housing 12 backward or proximally. Thus, in some embodiments, a risk of exposure of the user to blood may be decreased.

Figure 2:
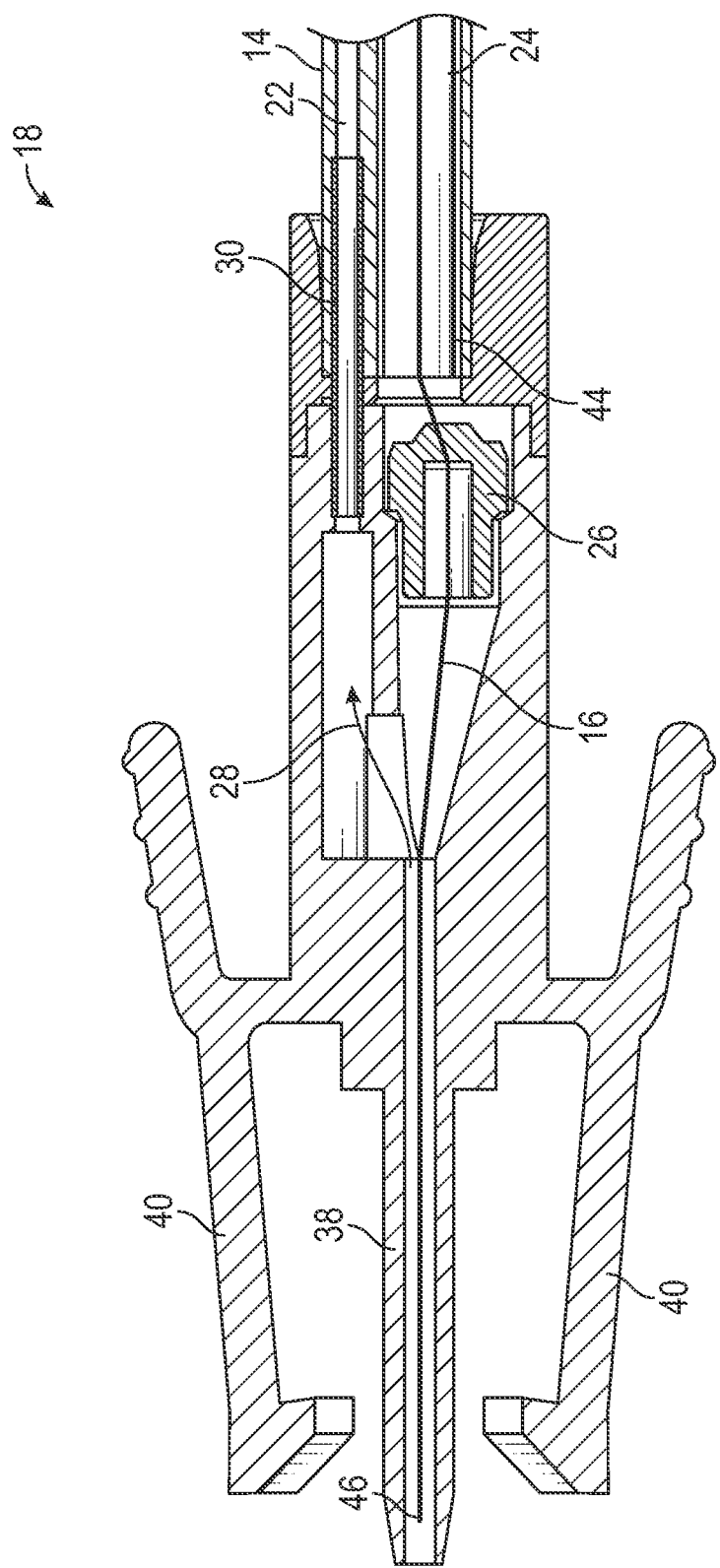
FIG. 2 is a cross-sectional view of an example distal end of the instrument advancement device, according to some embodiments.

As illustrated in FIG. 2, in some embodiments, the extension tube 14 may include a first lumen 22 and a second lumen 24, which may be separate from the first lumen 22 along an entire length of the extension tube 14. In some embodiments, a blood collection pathway may extend through the first lumen 22. In some embodiments, the instrument 16 may be disposed within the second lumen 24. In some embodiments, a diameter of the second lumen 24 may be larger than a diameter of the first lumen 22. In some embodiments, the diameter and/or a length of the first lumen 22 may be selected based on a desired flow rate and/or to reduce hemolysis. In some embodiments, different materials may be co-extruded to form the first lumen 22 and the second lumen 24. In some embodiments, the first lumen 22 and the second lumen 24 may be formed of different materials or a same material.

In some embodiments, in response to moving the housing 12 distally along the extension tube 14, the instrument 16 may be advanced distally within the second lumen 24. In some embodiments, in response to moving the housing 12 proximally along the extension tube 14, the instrument 16 may be retracted proximally within the second lumen 24.

In some embodiments, the instrument advancement device 10 may include a septum 26 disposed within the distal connector 18 and configured to seal the second lumen 24 or prevent blood flow into the second lumen 24. In these and other embodiments, the septum 26 may not seal the first lumen 22 such that blood may flow proximally along a fluid pathway 28 from the distal connector 18 through the first lumen 22 for blood collection. In some embodiments, the septum 26 may be elastomeric.

In some embodiments, a distal end of the instrument 16 may be disposed proximal to a distal end of the distal connector 18 when the housing 12 is fully retracted in a proximal direction. In some embodiments, the distal end of the instrument 16 may be disposed proximal to the septum 26 when the housing 12 is fully retracted in the proximal direction and/or the instrument 16 may be sealed within the extension tube 14.

In some embodiments, the instrument advancement device 10 may include a cannula 30, which may connect a distal end of the first lumen 22 and the distal connector 18. In some embodiments, the cannula 30 may be blunt. In some embodiments, the fluid pathway 28 may extend through the cannula 30, which may prevent blood leakage. In some embodiments, the cannula 30 may be constructed of steel, plastic, metal, or another suitable material. In some embodiments, the cannula 30 may be coupled to the distal connector 18 or monolithically formed with the distal connector 18 as a single unit. In some embodiments, the septum 26 may be concentric with the second lumen 24 or offset slightly to obtain adequate wall thicknesses.

In some embodiments, the distal connector 18 may include a shaft 38 and two lever arms 40. In some embodiments, the two lever arms 40 may facilitate coupling to the needleless access connector. In some embodiments, the shaft 38 may be lubricated with a lubricant, which may reduce a force of insertion into the catheter assembly. In some embodiments, the male distal connector may include a male luer, a male luer lock, a male slip luer, a luer, or another suitable connector.

Figure 3:
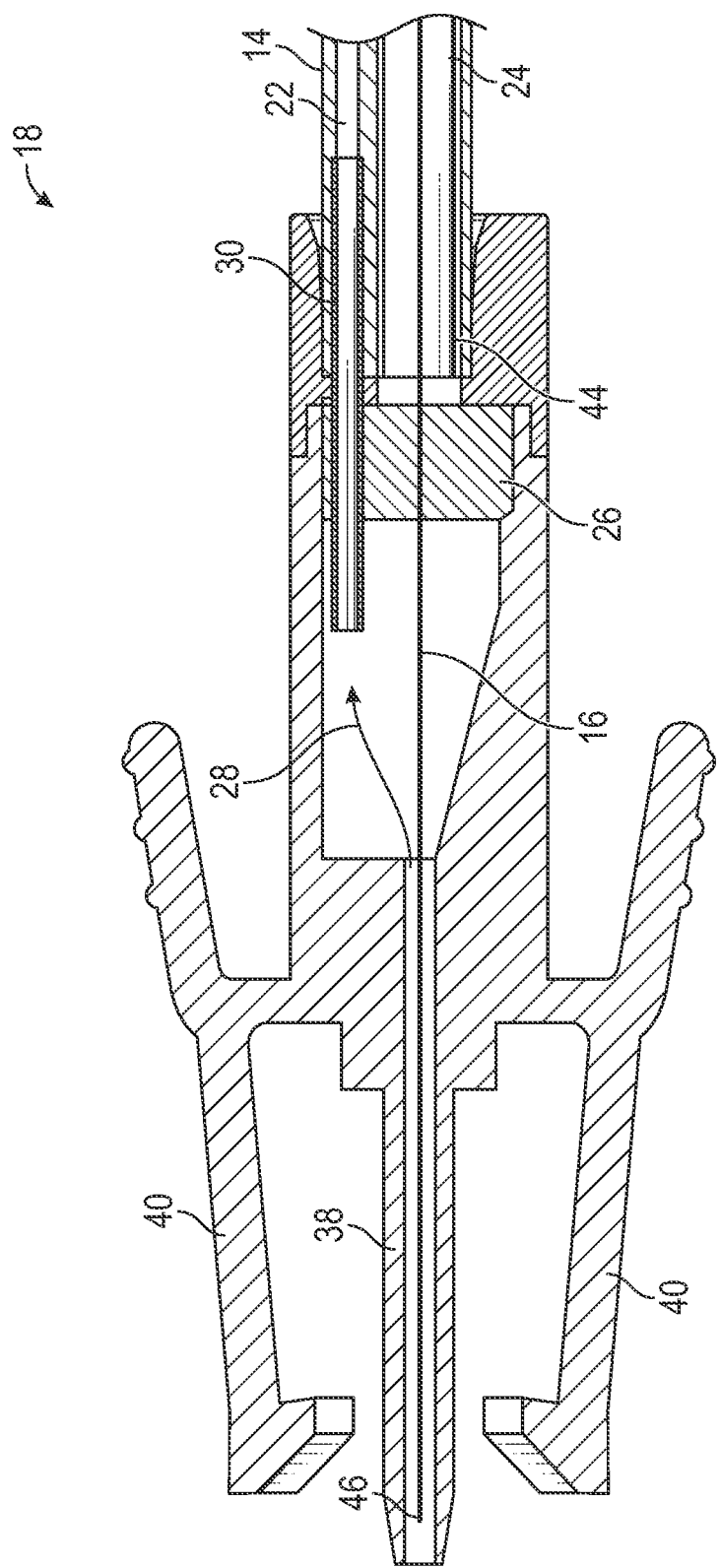
FIG. 3 is a cross-sectional view of another example distal end of the instrument advancement device, according to some embodiments.

As illustrated in FIG. 3, in some embodiments, the septum 26 may extend across a width of an inner lumen of the distal connector 18. In some embodiments, the septum 26 may seal the second lumen 24 or prevent blood flow into the second lumen 24. In some embodiments, the cannula 30 may extend from the first lumen 22 through the septum 26 to allow fluid flow therethrough.

Figure 4:
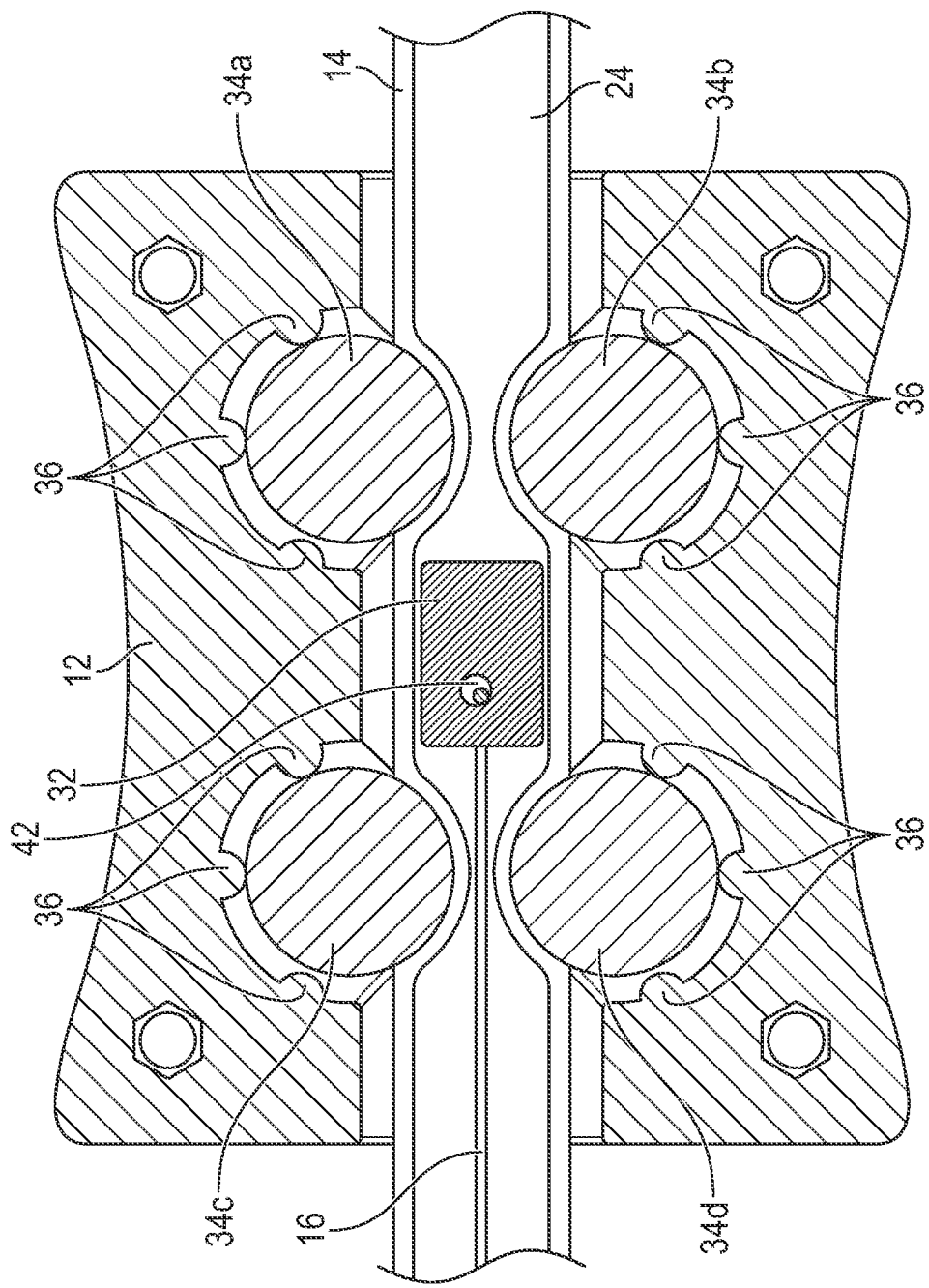
FIG. 4 is a cross-sectional view of an example housing of the instrument advancement device, illustrating an example extension tube extending therethrough, according to some embodiments.

As illustrated in FIG. 4, in some embodiments, the instrument advancement device 10 may include a wedge 32 disposed within the housing 12 and the second lumen 24 of the extension tube 14. In some embodiments, the instrument advancement device 10 may include a pair of opposing pinch members 34 configured to pinch the extension tube 14. In some embodiments, the pair of opposing pinch members 34a,b may be disposed within the housing 12 proximal to the wedge 32 and configured to move along the extension tube 14 with the housing 12.

In some embodiments, the instrument 16 may be disposed within the second lumen 24. In some embodiments, in response to moving the housing 12 distally along the extension tube 14, the pair of opposing pinch members 34a,b may push the wedge 32 distally, and the instrument 16 may be advanced distally.

In some embodiments, the instrument advancement device 10 may include another pair of opposing pinch members 34c,d configured to pinch the extension tube 14. In some embodiments, the other pair of opposing pinch members 34c,d may be disposed within the housing distal to the wedge 32 and configured to move along the extension tube 14 with the housing 12. In some embodiments, in response to moving the housing 12 proximally along the extension tube 14, the pair of opposing pinch members 34c,d may push the wedge 32 proximally and the instrument 16 may be retracted proximally.

The pair of opposing pinch members 34a,b and the other pair of opposing pinch members 34c,d may be referred to collectively in the present disclosure as "opposing pinch members 34." In some embodiments, in response to movement of the housing 12 along the extension tube 14, the opposing pinch members 34 may rotate with respect to the housing 12 and the extension tube 14. In some embodiments, in response to movement of the housing 12 along the extension tube 14, the opposing pinch members 34 may rotate with respect to the housing 12 and the extension tube 14, which may rotate the instrument 16 and move a distal tip of the catheter away from an obstruction. In some embodiments, an inner surface of the housing 12 may include one or more bumps 36 in contact with the opposing pinch members 34, which may reduce friction as the opposing pinch members 34 rotate. In some embodiments, the wedge 32 and/or the opposing pinch members 34 may be lubricated with a lubricant, which may reduce friction.

In some embodiments, the opposing pinch members 34 may be constructed of plastic, metal, or another suitable material. In some embodiments, the opposing pinch members 34 may include spherical balls, ball bearings, wheels, or cylinders, which may be configured to rotate with respect to the housing 12. In some embodiments, the opposing pinch members 34 may include the wheels, which may be smooth or include feet along their edges. In these embodiments, lubricant may be applied to axles of the wheels to reduce friction. In some embodiments, the opposing pinch members 34 may be fixed with respect to the housing 12. For example, the opposing pinch members 34 may be molded into the housing 12.

In some embodiments, a number of the opposing pinch members 34 may vary based on a shape of the wedge 32. In some embodiments, the instrument advancement device 10 may include the pair of opposing pinch members 34a,b and the other pair of opposing pinch members 34c,d in response to the shape of the wedge 32 being cylindrical, for example. In some embodiments, the instrument advancement device 10 may include a single pair of the opposing pinch members 34, such as the pair of the opposing pinch members 34a,b, in response to the wedge 32 including a dog bone shape, and the single pair may be disposed in a middle or depression of the dog bone shape.

In some embodiments, the wedge 32 may include an arc-shaped channel 42, which may be U-shaped. In some embodiments, a radius of the arc-shaped channel 42 may be approximately equal to or match a radius of curvature of the instrument 16. In some embodiments, the arc-shaped channel 42 may be centered or off-center within the wedge 32. In some embodiments, the instrument 16 may extend and move through the arc-shaped channel 42. In some embodiments, a first end 44 of the instrument 16 may be fixed. In some embodiments, the first end 44 of the instrument 16 may be fixed within the extension tube 14 or the distal connector 18. In further detail, in some embodiments, the first end 44 of the instrument 16 may be coupled to an inner surface of the extension tube 14 and/or an inner surface of the distal connector 18. In some embodiments, the first end 44 may be generally parallel to a second end 46 of the instrument 16, which may be free.

In some embodiments, in response to movement of the wedge 32 a first distance, the second end 46 of the instrument 16 may be configured to advance distally a second distance. In some embodiments, the second distance may be twice the first distance. In some embodiments, the second distance may be more than twice the first distance. In these and other embodiments, the instrument 16 may extend through multiple U-shapes or other arc-shapes.

Figure 5A:
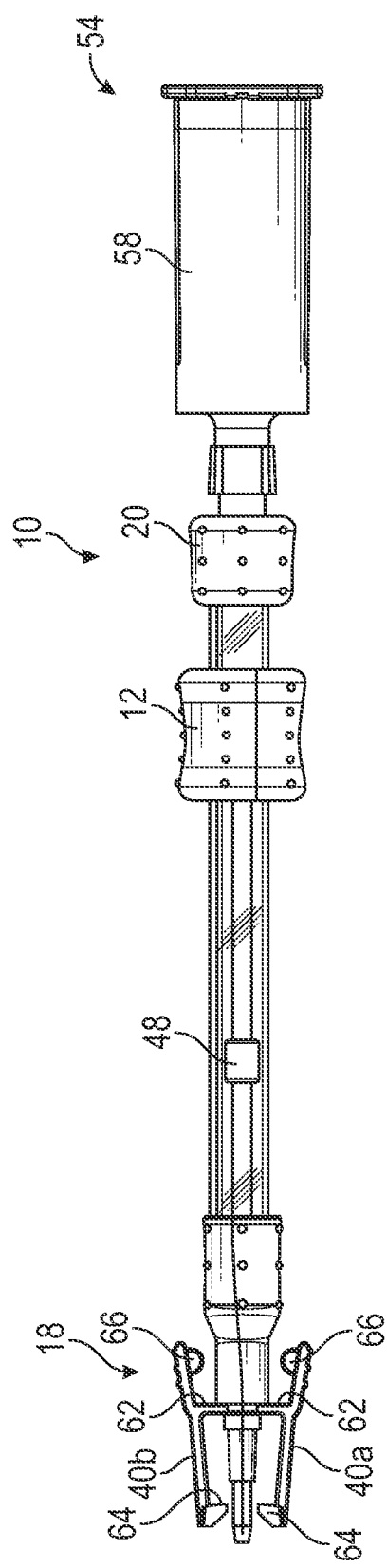
FIG. 5A is an upper perspective view of the instrument advancement device, illustrating an example housing in a retracted position, according to some embodiments.
Figure 5B:
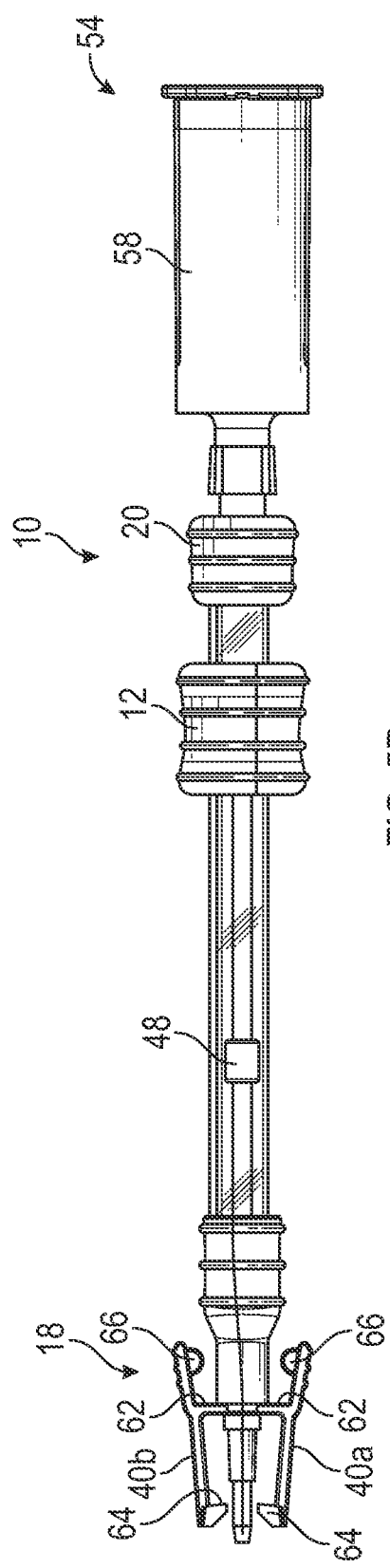
FIG. 5B is an upper perspective view of the instrument advancement device, illustrating another example housing in retracted position, according to some embodiments.
Figure 5C:
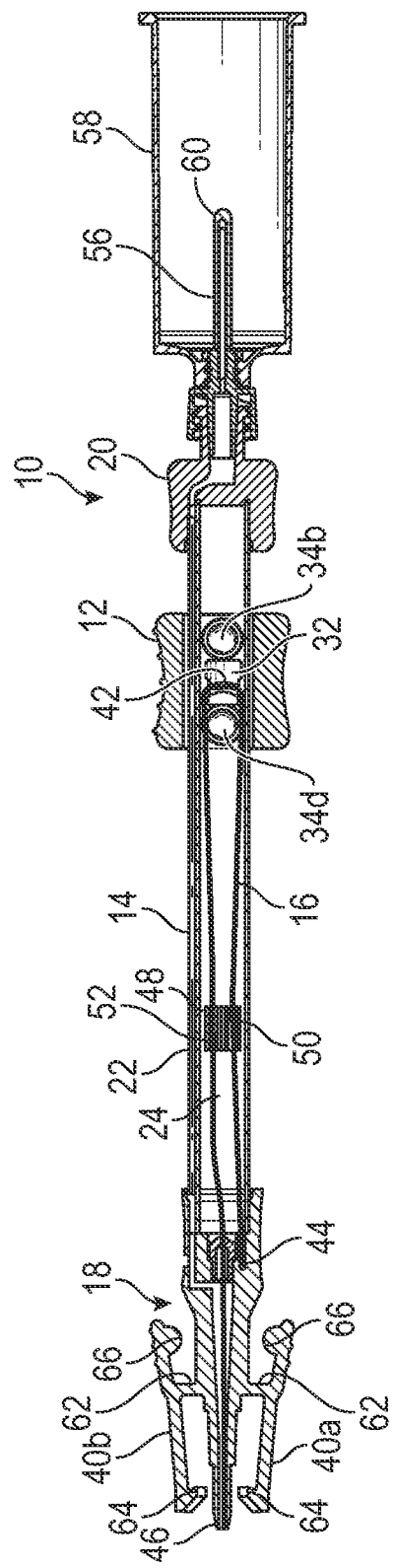
FIG. 5C is a cross-sectional view of the instrument advancement device, according to some embodiments.

Referring now to FIGS. 5A-5C, in some embodiments, the instrument 16 may tend to buckle in response to the wedge 32 being advanced distally. In some embodiments, a support element 48 may be disposed within a lumen of the extension tube to reduce buckling of the instrument 16. For example, the support element 48 may be disposed in the second lumen 24. In some embodiments, a position of the support element 48 may vary. In some embodiments, the support element 48 may be disposed approximately in a middle of the wedge 32 and the distal connector 18 when the housing 12 is in a retracted position. Thus, in some embodiments, the support element 48 may provide support in an area of the instrument 16 prone to buckling.

In some embodiments, the instrument 16 may extend through the support element 48. In some embodiments, the support element 48 may include a first hole 50 and a second hole 52. In some embodiments, the first end 44 of the instrument 16 may extend through the first hole 50. In some embodiments, the second end 46 of the instrument 16 may extend through the second hole 52.

In some embodiments, the proximal connector 20 may be coupled to a blood collection device 54. In some embodiments, the blood collection device 54 may include a syringe, a BD VACUTAINER® one-use holder (available from Becton, Dickinson and Company of Franklin Lakes, New Jersey), a BD VACUTAINER® LUER-LOK™ access device (also available from Becton, Dickinson and Company of Franklin Lakes, New Jersey), or another suitable blood collection device, which may provide suction. In some embodiments, the blood collection device 54 may include a sharp cannula 56 surrounded by a holder 58, which may be configured to receive a container such as a test tube or BD VACUTAINER® Blood Collection Tube, available from Becton Dickinson & Company of Franklin Lakes, New Jersey. In some embodiments, the sharp cannula 56 may be covered by an elastomeric sheath 60, which may be pierced by the sharp cannula 56 during insertion of the sharp cannula 56 through a seal of the test tube or the BD VACUTAINER® Blood Collection Tube.

In some embodiments, the housing 12 and/or the proximal connector 20 may include various shapes, which may facilitate gripping of the housing 12 and/or the proximal connector 20 by the user. For example, the housing 12 and/or the proximal connector 20 may be ovular, circular, square, or another shape. In some embodiments, a shape of the proximal connector 20 and/or the distal connector 18, as illustrated, for example, in FIGS. 5A-5B, may enable the user to more easily slide the housing 12 proximally and/or distally by providing gripping locations to counter flexing of the extension tube 14. In some embodiments, an outer surface of the housing 12 and/or an outer surface of the proximal connector 20 may include one or more protrusions to facilitate gripping. In some embodiments, the protrusions may include bumps, rings, or another shape.

In some embodiments, the wedge 32 may include various shapes. In some embodiments, the wedge 32 may include an oval shape with major and minor diameters less than those of the lumen in which it may slide. In some embodiments, the wedge 32 may include a smaller major diameter at the arc-shaped channel 42, which may reduce friction between the instrument 16 and the extension tube 14. In some embodiments, the wedge 32 may include a larger major diameter on one or more sides to prevent the wedge 32 from rotating with respect to the extension tube 14. In some embodiments, a length of the wedge 32 may be larger than a major diameter of the lumen in which the wedge 32 slides to prevent the wedge 32 from rotating.

In some embodiments, the distal connector 18 may include the shaft 38 and the two lever arms 40a,b disposed on opposite sides of the shaft 38. In some embodiments, the shaft 38 may include a blunt cannula, which may be cylindrical. In some embodiments, the two lever arms 40a,b may oppose each other and may each be connected to a body of the distal connector 18 at a flex point 62. In some embodiments, a hook member 64 disposed at a distal end of each of the two lever arms 40a,b may be configured to be disposed within a groove of the catheter assembly when the two lever arms 40a,b are in a relaxed position, as illustrated, for example, in FIGS. 5A-5C. In some embodiments, the groove may be annular.

In some embodiments, a proximal end of each of the two lever arms 40a,b proximal to the flex point 62 may be pressed inwardly to bias a distal end of each of the two lever arms 40a,b outwardly and release the hook member 64 from the groove. In some embodiments, the distal end of each of the two lever arms 40a,b may automatically return from the biased positioned to the relaxed position in response to the proximal end of each of the two lever arms 40a,b being released or not pressed inwardly.

In some embodiments, the proximal end of each of the two lever arms 40a,b may include a stop protrusion 66, which may prevent pressing the two lever arms 40a,b far enough to yield or break the two lever arms 40a,b. In some embodiments, the stop protrusion 66 of each of the two lever arms 40a,b may be disposed opposite each other on the body of the proximal connector 20 instead of on the two lever arms 40a,b. In some embodiments, the stop protrusion 66 may limit a distance the two lever arms 40a,b can be pressed by providing a hard stop.

As illustrated in FIGS. 5A-5C, in some embodiments, the blunt cannula may include a luer shape, which may include a luer. In some embodiments, the luer shape may include an annular stepped surface. In some embodiments, the luer shape may facilitate sealing with devices such as, for example, the BD Q-SYTE™ needle-free connector, both available from Becton & Dickinson of Franklin Lakes, New Jersey. In some embodiments, the luer shape may reduce stress on a septum of the BD SMARTSITE™ needle-free connector or BD Q-SYTE™ (available from Becton & Dickinson of Franklin Lakes, New Jersey) or similar device and prevent the septum from being displaced in response to removal of the blunt cannula.

Figure 6C:
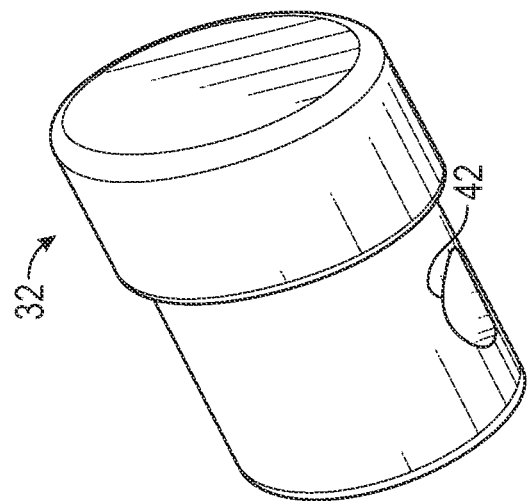
FIG. 6C is another upper perspective view of the wedge, according to some embodiments.
Figure 6B:
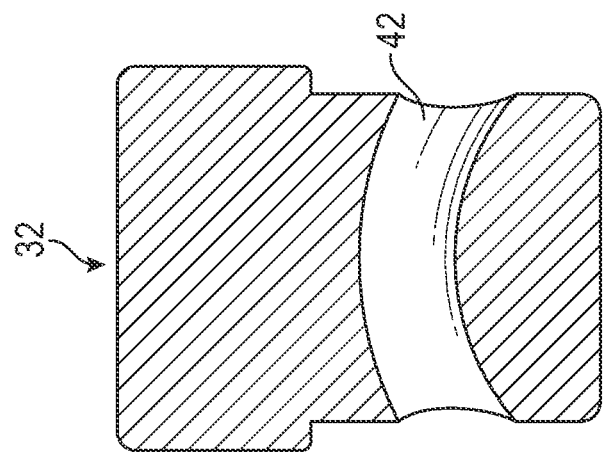
FIG. 6B is a cross-sectional view of the wedge, according to some embodiments.
Figure 6A:
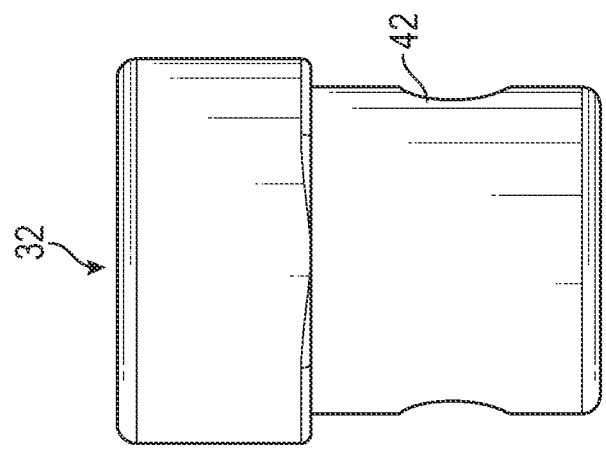
FIG. 6A is an upper perspective view of an example wedge, according to some embodiments.
Figure 6D:
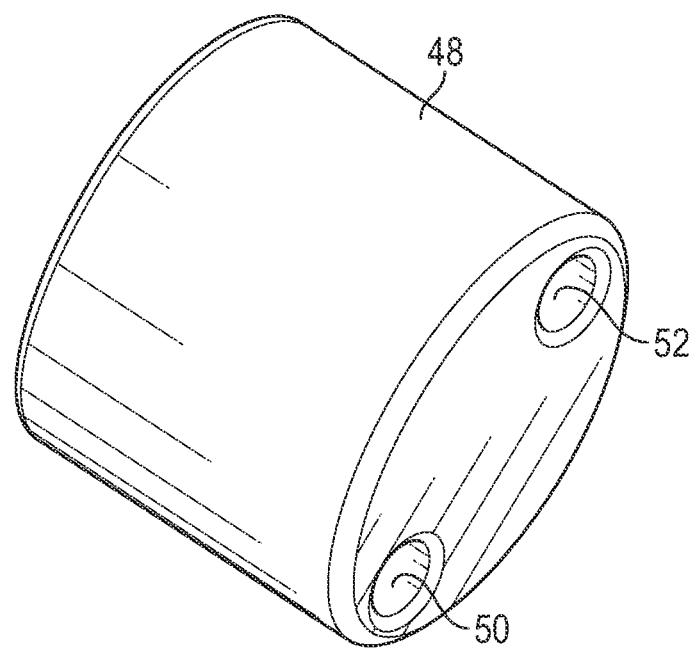
FIG. 6D is an upper perspective view of an example support element, according to some embodiments.
Figure 6E:
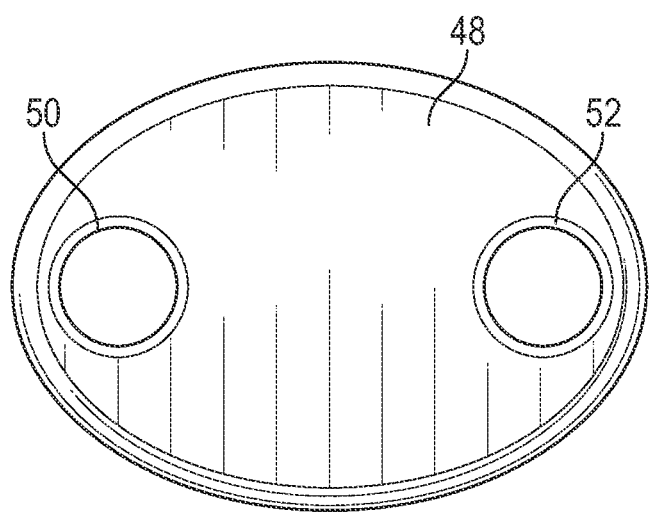
FIG. 6E is a proximal end view of the support element, according to some embodiments.

Referring now to FIGS. 6A-6C, the arc-shaped channel 42 within the wedge 32 is illustrated, according to some embodiments. Referring now to FIGS. 6D-6E, the support element 48 is illustrated, according to some embodiments. In some embodiments, the support element 48 may include the first hole 50 and the second hole 52, which may each support the instrument 16 extending therethrough and prevent buckling of the instrument 16.

Figure 7:
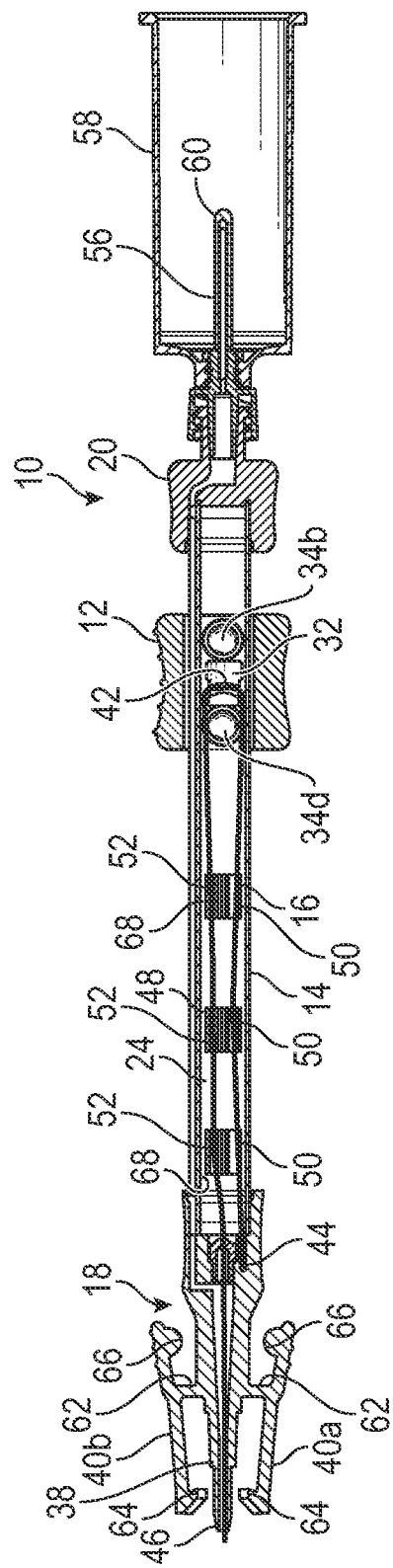
FIG. 7 is a cross-sectional view of the instrument advancement device, illustrating multiple support elements, according to some embodiments.

Referring now to FIG. 7, in some embodiments, the instrument advancement device 10 may include one or more other support elements 68, which may be disposed within a lumen of the extension tube 14, such as, for example, the second lumen 24. In some embodiments, the other support elements 68 may be similar or identical to the support element 48 in terms of one or more features and/or operation. In some embodiments, the support element 48 and the support elements 68 may be evenly spaced apart distal to the wedge 32 within the extension tube 14. In some embodiments, each of the other support elements 68 may include the first hole 50 and the second hole 52 extending therethrough. In some embodiments, one or more of the other support elements 68 may have different lengths. In some embodiments, the first hole 50 and/or the second hole 52 of the support element 48 and/or the other support elements 68 may be lubricated to reduce friction and facilitate movement of the instrument 16 therethrough.

In some embodiments, the support element 48 and/or the other support elements 68 may prevent buckling of the instrument 16 as the instrument 16 is advanced distally and/or retracted proximally. In some embodiments, the support element 48 and/or the other support elements 68 may be cylindrical or ovular in shape. In some embodiments, a length of the support element and/or a length of the other support elements 68 may be greater than an inner diameter of a lumen in which disposed, such as the second lumen 24, which may prevent rotation of the support element 48 and/or the other support elements 68. In some embodiments, the first hole 50 and/or the second hole 52 may be replaced with grooves extending from an outer edge, which may support the instrument 16. In some embodiments, the first hole 50 and/or the second hole 52 may be circular, semi-circular, or another suitable shape.

In some embodiments, the support element 48 and/or the other support elements 68 may decrease an effective length of the instrument 16 to increase a buckling load per the equation:

$$P_E = \frac{\pi^2 EI}{L^2}$$

where $P_E$ is the critical buckling load, E is the Young's modulus, I is the moment of inertia that resists the direction of buckling, and L is the length of the instrument 16.

Figure 8A:
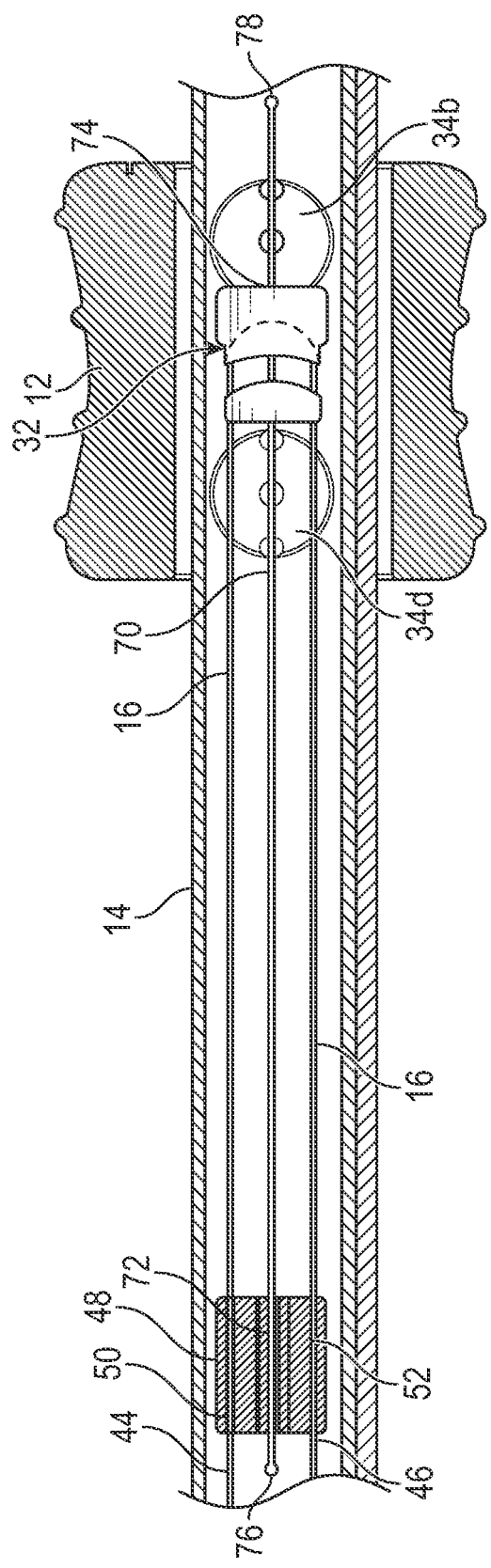
FIG. 8A is a cross-sectional view of the instrument advancement device, illustrating an example tether, according to some embodiments.
Figure 8B:
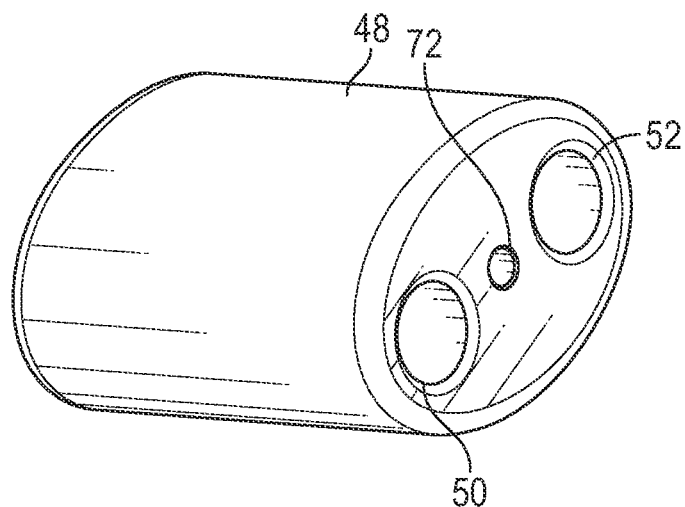
FIG. 8B is an upper perspective view of the support element, illustrating an example aperture for the tether, according to some embodiments.
Figure 8C:
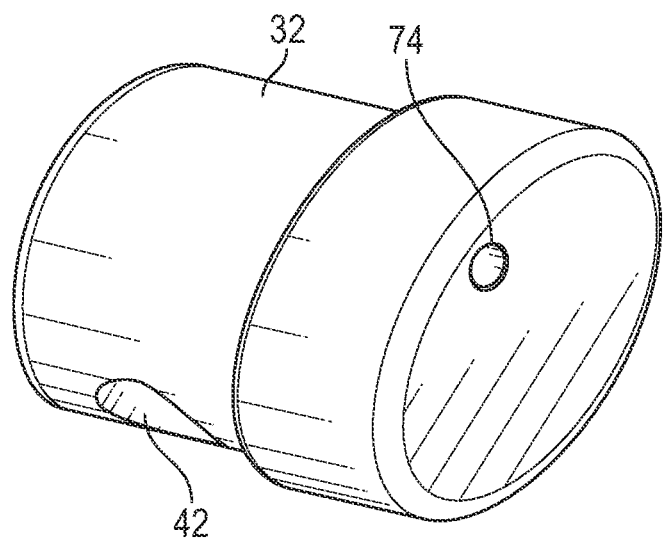
FIG. 8C is an upper perspective view of the wedge, illustrating an example other aperture for the tether, according to some embodiments.

Referring now to FIGS. 8A-8C, in some embodiments, the wedge 32 may be configured to contact the support element 48 and move the support element 48 distally in response to movement of the wedge 32 distally. In some embodiments, the wedge 32 may contact and move the other support elements 68 (see, for example, FIG. 7) similar to the support element 48.

In some embodiments, the instrument advancement device 10 may include a tether 70 extending between the wedge 32 and the support element 48. In some embodiments, the tether 70 may be fixed to the wedge 32 and the support element 48 such as via a press fit, adhesive, weld, or other means. In these and other embodiments, retraction of the wedge 32 in the proximal direction may also retract the support element 48 due to pulling by the tether 70. In some embodiments, the tether 70 may be rigid or flexible.

In some embodiments, the support element 48 may include an aperture 72 extending therethrough. In some embodiments, the tether 70 may extend through the aperture 72, and the wedge 32 may be configured to move without moving the support element 48. In some embodiments, the wedge 32 may include another aperture 74 extending therethrough, and the tether 70 may extend through the other aperture 74. In some embodiments, the aperture 72 may be centered or off-centered within the support element 48. In some embodiments, the other aperture 74 may be centered or off-centered within the wedge 32. In some embodiments, the first hole 50 and/or the second hole 52 for the instrument 16 may be centered to accommodate the aperture 72 and/or the other aperture 74 for the tether 70. In some embodiments, the first hole 50 and/or the second hole 52 for the instrument 16 may be off-centered to accommodate the aperture 72 and/or the other aperture 74 for the tether 70.

In some embodiments, a distal end of the tether 70 may be distal to the support element 48 and/or may include a catch 76. In some embodiments, a proximal end of the tether 70 may be proximal to the wedge 32 and/or may include another catch 78. In some embodiments, an outer diameter of the catch 76 may be greater than a diameter of the aperture 72 and/or an outer diameter of the other catch 78 may be greater than an outer diameter of the other aperture 74. Thus, in some embodiments, in response to movement of the wedge 32 proximally, the catch 76 may contact a distal end of the support element 48 and the other catch 78 may contact a proximal end of the wedge 32 to pull the support element 48 in the proximal direction.

Referring now to FIG. 9A, in some embodiments, the instrument advancement device 10 may include a compressible element 80 disposed within a lumen of the extension tube 14, such as, for example, the second lumen 24, distal to the wedge 32. In some embodiments, in response to distal movement the wedge 32, the wedge 32 may be configured to contact the compressible element 80 to compress the compressible element 80. In some embodiments, the compressible element 80 may include a spring (as illustrated in FIG. 9A), a telescoping device, a tube, or another compressible element. In some embodiments, the spring may be circular, ovular, square, or another suitable shape. In some embodiments, the compressible element 80 may be compressible in a distal-proximal and/or proximal-distal direction.

In some embodiments, a length of the compressible element 80 may extend from the wedge 32 or housing 12 to the distal connector 18. In some embodiments, the compressible element 80 may extend partially between the wedge 32 or housing 12 and the distal connector 18, covering spots prone to buckling. In some embodiments, the compressible element 80 may be disposed approximately in a middle of the wedge 32 and the distal connector 18 when the housing 12 is in a retracted position, as illustrated in FIG. 9A, for example. Thus, in some embodiments, the compressible element 80 may provide support in an area of the instrument 16 prone to buckling. In some embodiments, the compressible element 80 may include the spring, and a spring constant of the spring may be weak enough such that when the spring is compressed, the spring cannot overcome the normal force or force of friction between the extension tube 14 and the pair of the opposing pinch members 34*a,b*, and/or the other pair of opposing pinch members 34*c,d*. Thus, in some embodiments, the user may not need to worry about the housing 12 springing back in a proximal direction.

In some embodiments, the compressible element 80 may support the instrument 16 to reduce buckling. In some embodiments, the compressible element 80 may be disposed between the first end 44 of the instrument 16 and the second end 46 of the instrument 16. In some embodiments, the compressible element 80 may support the first end 44 and the second end 46 at a same time to reduce buckling of the instrument 16.

Referring now to FIG. 9B, in some embodiments, the first end 44 may extend through the compressible element 80, which may prevent the first end 44 from buckling. Referring now to FIG. 9C, the second end 46 may extend through the compressible element 80, which may prevent the second end 46 from buckling. Referring now to FIG. 9D, in some embodiments, the instrument advancement device 10 may include another compressible element 82 disposed within the lumen of the extension tube 14, such as, for example, the second lumen 24, distal to the wedge 32. In some embodiments, the other compressible element 82 may be similar or identical to the compressible element 80 in terms of one or more features and/or operation. In some embodiments, the first end 44 of the instrument 16 may extend through the compressible element 80. In some embodiments, the second end 46 of the instrument 16 may extend through the other compressible element 82.

Figure 10:
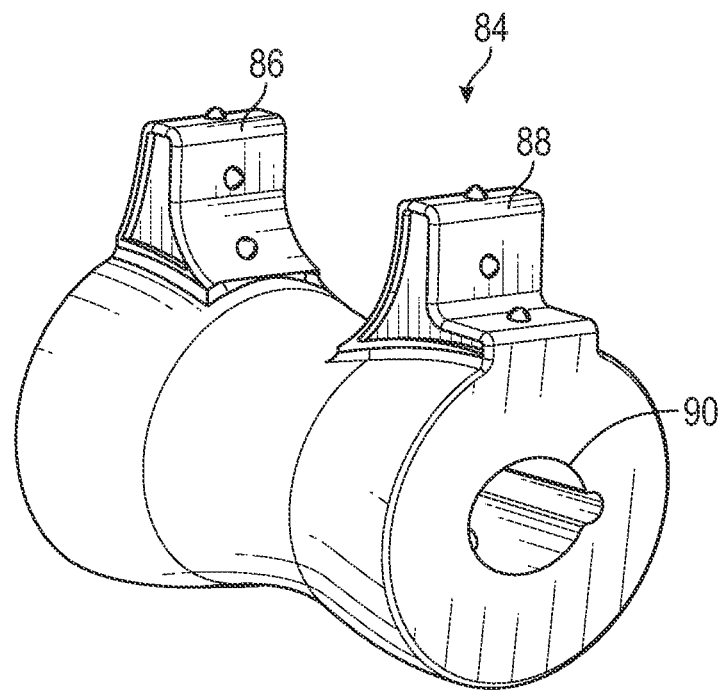
FIG. 10 is an upper perspective view of another example housing, according to some embodiments.

Referring now to FIG. 10, in some embodiments, a housing 84 may include a first push tab 86 and/or a second push tab 88. In some embodiments, the housing 84 may be similar or identical to the housing 12 of FIGS. 1-9 in terms of one or more features and/or operation. In some embodiments, the first push tab 86 and the second push tab 88 may allow the clinician to advance the instrument 16 in a distal direction without repositioning his or her hand. The housing 84 may otherwise need to be slid further in the distal direction than an average hand size can slide the housing 84 in one push, and the clinician would reposition his or her hand to continue to push the housing 84 in the distal direction. In some embodiments, to advance the instrument 16 from the retracted position to the advanced position, the clinician may reposition his or her finger but not his or her hand grip due to the second push tab 88 in addition to the first push tab 86. In some embodiments, the housing 84 may include more than two push tabs, which may extend a length of the housing 84.

In some embodiments, the first push tab 86 may be distal to the second push tab 88 and/or at a distal end of the housing 84. In some embodiments, the second push tab 88 may be at a proximal end of the housing 84. In some embodiments, the first push tab 86 and the second push tab 88 may be a same height, which may facilitate securement of the finger of clinician. In some embodiments, the first push tab 86 and the second push tab 88 may be different heights. For example, the first push tab 86 may be taller than the second push tab 88, which may make the upper surface of the housing 84 easier to push on if the finger cannot fit between the first push tab 86 and the second push tab 88. In some embodiments, the housing 84 may include an opening 90 extending therethrough and configured to receive the extension tube 14. In some embodiments, the first push tab 86 and the second push tab 88 may facilitate one-handed advancement of the instrument 16 by the clinician.

Figure 11:
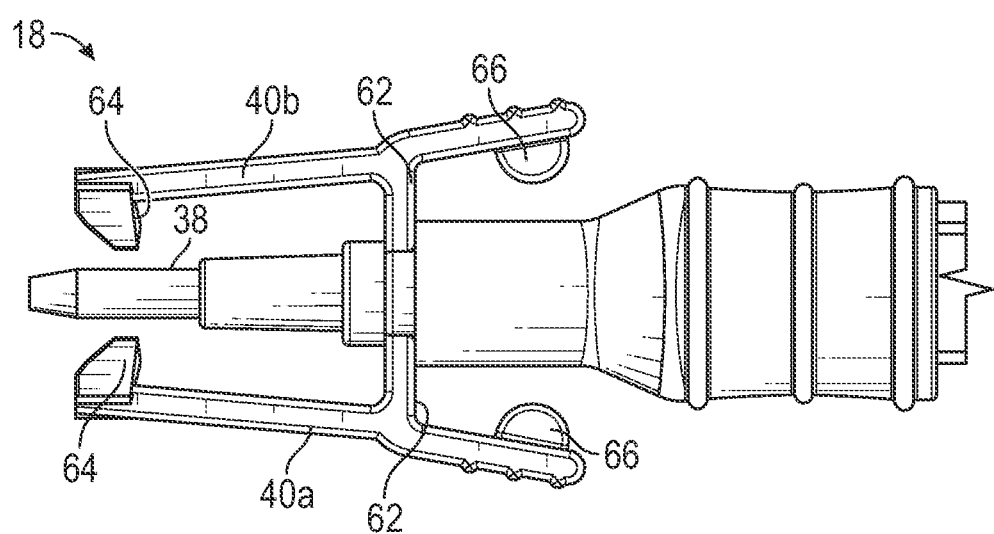
FIG. 11 is an upper perspective view of an example distal connector, according to some embodiments.

Referring now to FIG. 11, the distal connector 18 is illustrated, according to some embodiments. In some embodiments, the proximal end of each of the two lever arms 40a,b may include a stop protrusion 66, which may prevent pressing the two lever arms 40a,b far enough to yield or break the two lever arms 40a,b. In some embodiments, the two lever arms 40a,b may oppose each other and may each be connected to a body of the distal connector 18 at the flex point 62. In some embodiments, the hook member 64 disposed at a distal end of each of the two lever arms 40a,b may be configured to clasp on a portion of the catheter assembly. In some embodiments, the stop protrusion 66 of each of the two lever arms 40a,b may be disposed opposite each other on the body of the distal connector 18 instead of on the two lever arms 40a,b.

Figure 12A:
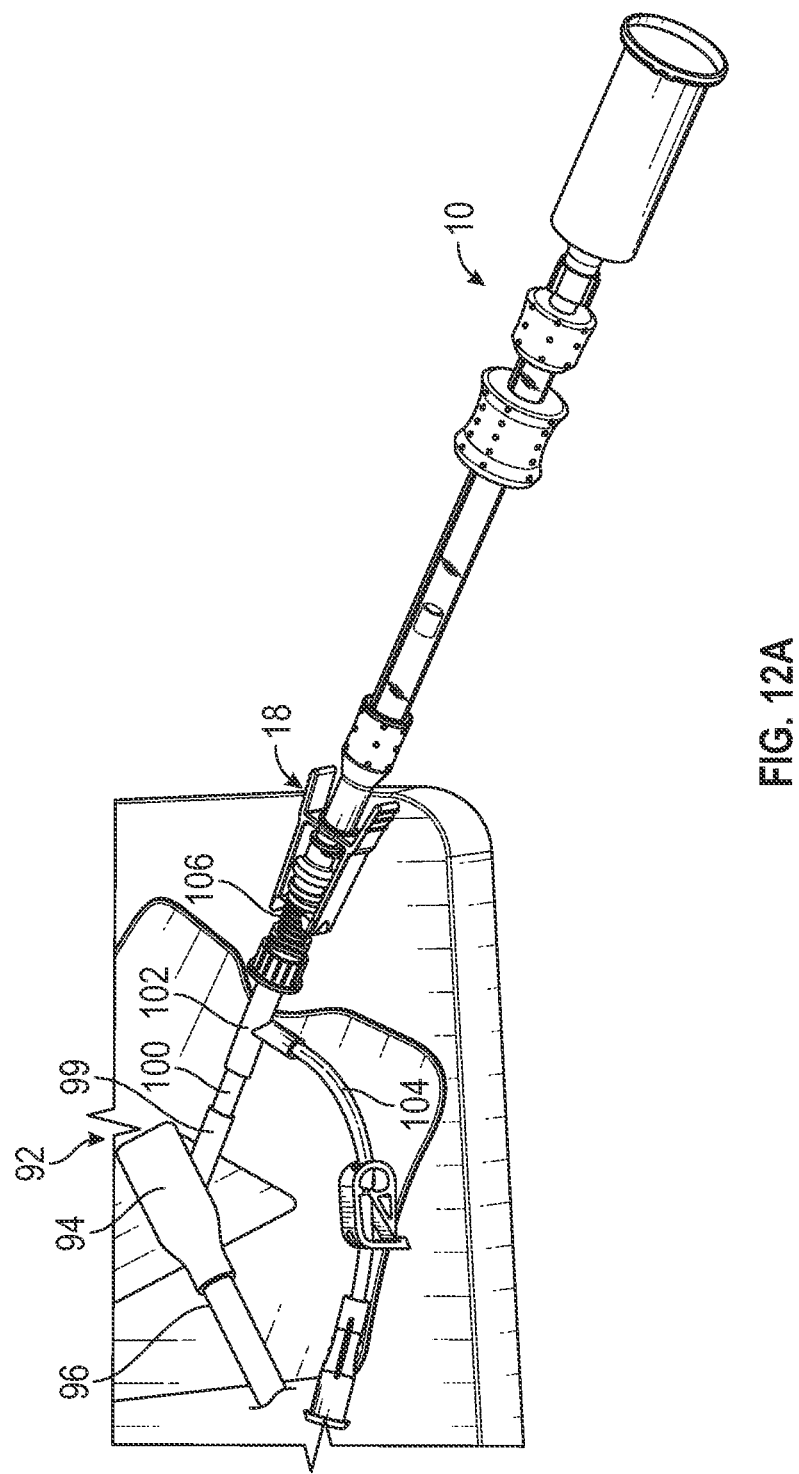
FIG. 12A is an upper perspective view of the instrument advancement device coupled to an example catheter assembly, according to some embodiments.

Referring now to FIG. 12A, in some embodiments, a catheter assembly 92 may include a catheter adapter 94, and a catheter 96 extending distally from a distal end of the catheter adapter 94. In some embodiments, the catheter adapter 94 may include a side port 99, and the catheter assembly 92 may include an extension tube 100 extending from the side port 99. In some embodiments, the catheter assembly 92 may include a connector 102, such as, for example, a T-connector, which may be coupled to a proximal end of the extension tube 100 and an extension tube 104. In some embodiments, the catheter assembly 92 may include a needleless access connector 106, which may be coupled to a proximal end of the connector 102 and the distal connector 18. In these and other embodiments, the catheter assembly 92 may be referred to as integrated, having the extension tube 100 that is integrated with the side port 99. In some embodiments, the instrument 16 would be inserted through the side port 99 and the catheter 96 in response to advancement of a particular housing in the distal direction.

Figure 12B:
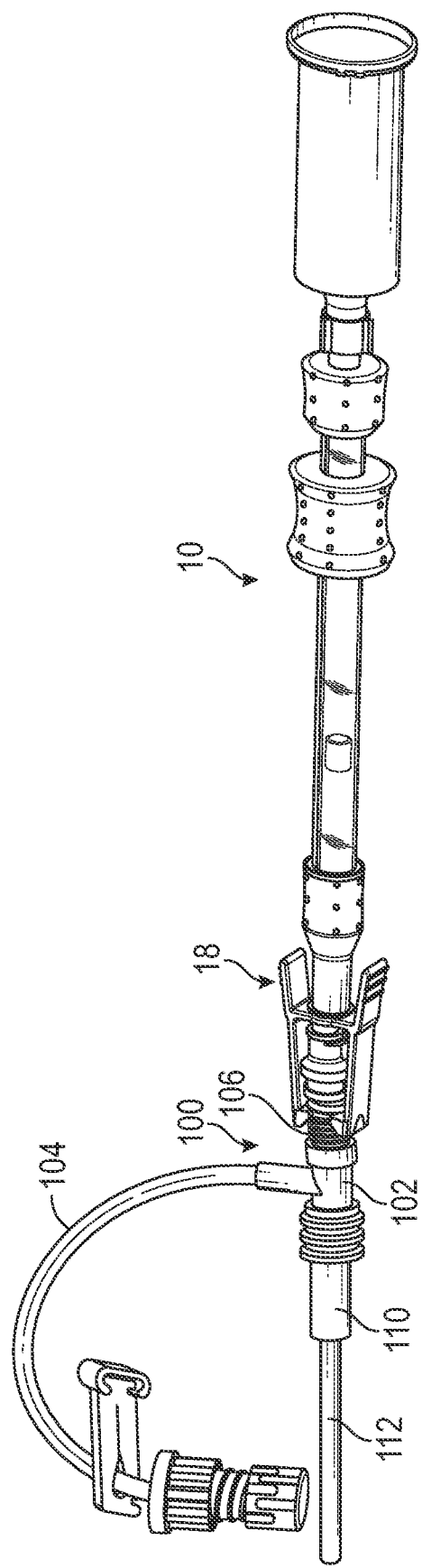
FIG. 12B is an upper perspective view of the instrument advancement device coupled to another example catheter assembly, according to some embodiments.

Referring now to FIG. 12B, in some embodiments, a catheter assembly 100 may include the connector 102, such as, for example, a T-connector, and the extension tube 104 coupled to the connector 102. In some embodiments, the catheter assembly 108 may include the needleless access connector 106 coupled to the connector 102 and the instrument advancement device 10. In some embodiments, the connector 102 may be coupled to a proximal end of a catheter adapter 110 of the catheter assembly 100. In some embodiments, the catheter assembly 100 may include a catheter 112 extending distally from a distal end of the catheter adapter 110. In these and other embodiments, the catheter assembly 108 may be referred to as straight. In some embodiments, the instrument 16 would be inserted through the proximal end of the catheter adapter 110 and the catheter 96 in response to advancement of a particular housing in the distal direction.

Figure 13A:
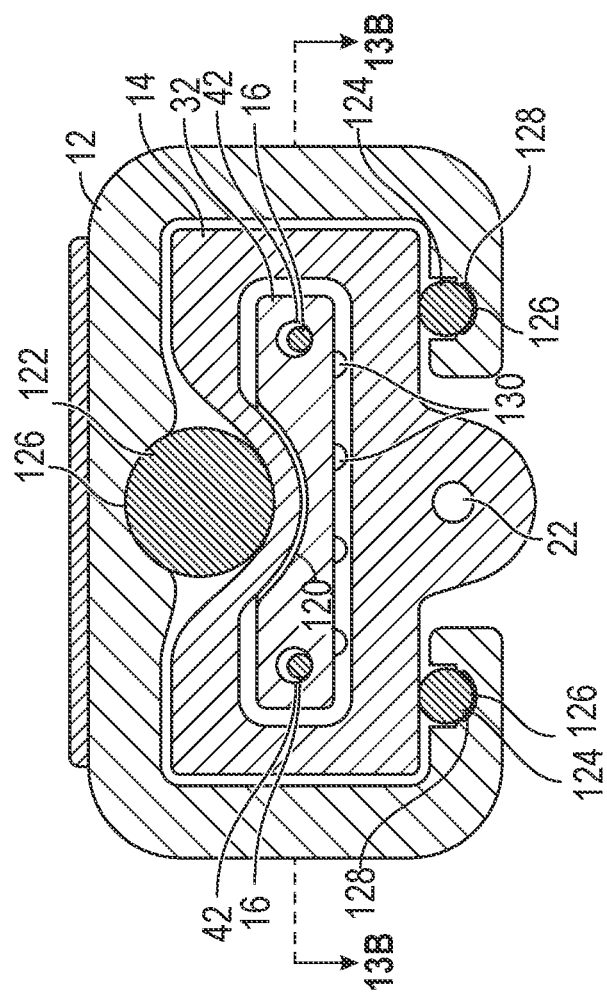
FIG. 13A is a transverse cross-sectional view of another instrument advancement device, according to some embodiments.
Figure 13B:
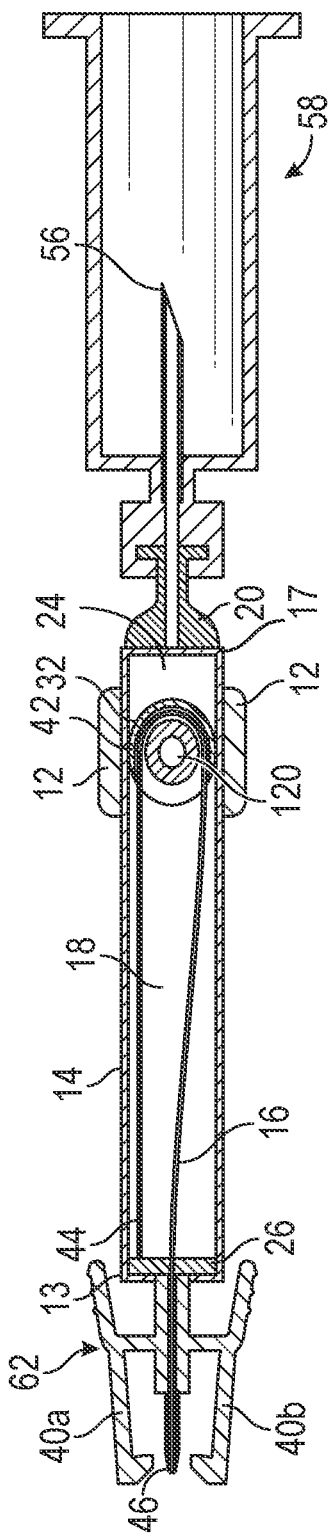
FIG. 13B is a longitudinal cross-sectional view of the other instrument advancement device, according to some embodiments.

Referring now to FIGS. 13A-13B, an instrument advancement device 119 is illustrated, according to some embodiments. In some embodiments, the instrument advancement device 119 may be similar or identical to the instrument advancement device 10 of one or more of FIGS. 1-12 in terms of one or more features and/or operation. In some embodiments, the wedge 32 may include a depression or pocket 120. In some embodiments, the pocket 120 may be disposed interior of the arc-shaped channel 42. In some embodiments, the wedge 32 may be disposed within a lumen of the extension tube 14, which may include the second lumen 24.

In some embodiments, the instrument advancement device 119 may include an instrument 16 extending through the arc-shaped channel 42. In some embodiments, the instrument 16 may improve patency of a catheter of the catheter assembly for medication and fluid delivery, as well as blood acquisition, through a dwell time of the catheter. In some embodiments, the catheter may be indwelling or inserted in vasculature of a patient when the instrument advancement device 119 is coupled to the catheter assembly. In some embodiments, the instrument advancement device 119 may facilitate blood flow and quality during blood collection, improve workflow, and reduce a risk of manipulation-related catheter complications.

In some embodiments, the second end 46 may include a rod, a coil, or any other suitable shape configured to facilitate thrombus removal and/or decrease damage to the vasculature. In some embodiments, the coil may surround the rod. In some embodiments, a distalmost portion of the second end 46 may be blunt to decrease a risk of damaging the vasculature. In some embodiments, the second end 46 may be porous to facilitate blood flow therethrough. In some embodiments, the first end 44 may be fixed inside the extension tube 14. For example, the first end 44 may be adhered, bonded, or secured within the extension tube 14 in another suitable manner.

In some embodiments, the second end 46 may be configured to advance distally a first distance in response to distal movement of the housing 12 a second distance. In some embodiments, the first distance may be at least twice the second distance. In some embodiments, movement of the instrument 16 may be facilitated without contacting the instrument 16 with the housing 12, which may reduce a risk of bacterial contamination of the instrument 16.

In some embodiments, the instrument advancement device 119 may include a translation feature 122 disposed between the housing 12 and an outer surface of the extension tube 14 and within the pocket 120 such that in response to distal movement of the housing 12 along the outer surface of the extension tube 14 the first distance, the wedge 32 may move distally within the lumen 18 the first distance, and the second end 46 of the instrument 16 may advance distally the second distance. In some embodiments, the translation feature 122 may include a ball, a wheel, a roller bearing, or another suitable feature configured to create a localized compression of the extension tube 14. In some embodiments, the translation feature 122 may be part of the housing 12 and/or monolithically formed with the housing 12 as a single unit.

In some embodiments, the extension tube 14 may be constructed of a flexible material, such as thermoplastic elastomer (TPE), thermoplastic polyurethane (TPU), PELLETHANE®, polyvinyl chloride (PVC), or another suitable material. In some embodiments, the extension tube 14 may include a lubricious additive to reduce friction and facilitate movement of the housing 12. In some embodiments, the flexible material may facilitate compression of the extension tube 14 by the translation feature 122. In some embodiments, the extension tube 14 may be constructed of one or more of the flexible material, a rigid material, and a semi-rigid material. In some embodiments, the extension tube 14 may be transparent to facilitate visualization of components therein and/or markings on the components, such as, for example, the instrument 16 and/or the wedge 32.

In some embodiments, the translation feature 122 may compress the extension tube 14 such that the extension tube 14 extends into the pocket 120. In some embodiments, the translation feature 122 compressing the extension tube 14 into the pocket 120 may facilitate movement of the wedge 32 with the housing 12.

In some embodiments, the instrument advancement device 119 may include one or more additional translation features 124. In some embodiments, the additional translation features 124 may be disposed on an opposite side of the housing 12 from the translation feature 122 and disposed between the extension tube 14 and the housing 12. In some embodiments, the translation feature 122 and/or the additional translation features 124 may prevent the extension tube 14 from contacting the housing 12, allowing the housing 12 to move along a longitudinal axis of the extension tube 14 with decreased friction. In some embodiments, the additional translation features 124 may each include a roller ball, a wheel, a bearing, or another suitable feature.

In some embodiments, the translation feature 122 and/or the additional translation features 124 may be disposed within depressions 126 in the housing 12. In some embodiments, a surface of one or more of the depressions 126 may include one or more small protrusions 128, which may decrease a size of a surface area of the housing 12 in contact with the translation feature 122 and/or the additional translation features 124. In some embodiments, the depressions 126 may be shaped generally similar to the translation feature 122 and/or the additional translation features 124, which may be spherical. In some embodiments, a surface of the wedge 32 opposite the pocket 120 may include one or more bumps 130, which may decrease a size of a surface area of the wedge 32 in contact with the housing 12 and allow the wedge 32 to move with respect to the extension tube 14 with decreased friction. In some embodiments, the wedge 32 may be generally triangular or three-point.

In some embodiments, the extension tube 14 may include a first lumen 22. In some embodiments, the first lumen 22 may extend through the distal end 13 of the extension tube 14 and the proximal end 17 of the extension tube 14 and may be configured for fluid flow therethrough. In some embodiments, a width and/or length of the first lumen 22 may be configured to provide a blood flow rate that reduces blood collection time while also reducing hemolysis during blood collection. In some embodiments, the 2× or greater than 2× advancement of the instrument 16 in response to 1× advancement of the housing 12 may enable the extension tube 14 and the first lumen 22, used for blood collection, to be shorter, resulting in less blood volume in the first lumen 22.

In some embodiments, the instrument advancement device 119 may include the septum 26, which may be disposed within the distal connector 18 or a distal end of the extension tube 14. In some embodiments, the instrument 16 may be configured to extend through the septum 26. In some embodiments, the septum 26 may be positioned to allow distal fluid flow into the first lumen 22 but may prevent distal fluid flow into the second lumen 24. In some embodiments, a proximal end of the second lumen 24 may be closed. For example, a septum or seal may be disposed within the proximal end of the second lumen 24 or may be closed by the extension tube 14. In some embodiments, the second lumen 24 may be larger than the first lumen 22. In some embodiments, the first lumen 22 may be centrally-running along the extension tube 14.

In some embodiments, the instrument 16 may be fully contained within the second lumen 24. In further detail, in some embodiments, the second end 46 of the instrument 16 may be disposed proximal to the septum 26 when the instrument 16 is in a fully retracted position and/or the housing 12 is in a proximal position. In other embodiments, the instrument 16 may extend through the septum 26 when the instrument 16 is in the fully retracted position and/or the housing 12 is in the proximal position, but the second end 46 may be disposed within the distal connector 18.

In some embodiments, the instrument advancement device 119 may include the support element 48 of FIG. 5C and/or the other support elements 68 of FIG. 7. In some embodiments, the instrument advancement device 119 may include the tether 70 of FIG. 8A and/or the compressible element 80 of FIGS. 9A-9D. In some embodiments, the tether 70 may include molded plastic. In some embodiments, the instrument advancement device 119 may include the other compressible element 82 of FIG. 9D.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. An instrument advancement device, comprising:
   a housing;
   an extension tube extending through the housing;
   a wedge disposed within the housing, wherein the wedge comprises an arc-shaped channel;
   a pair of opposing pinch members configured to pinch the extension tube, wherein the pair of opposing pinch members are disposed within the housing and configured to move along the extension tube with the housing;
   an instrument extending through the arc-shaped channel, wherein a first end of the instrument is fixed, wherein in response to moving the housing distally along the extension tube, the pair of opposing pinch members push the wedge distally, wherein in response to movement of the wedge distally a first distance, a second end of the instrument is configured to advance distally a second distance, wherein the second distance is at least twice the first distance; and
   a support element disposed within a lumen of the extension tube and configured to reduce buckling of the instrument, wherein the instrument extends through the support element.

2. The instrument advancement device of claim 1, wherein the support element comprises a first hole or groove and a second hole or groove, wherein the first end of the instrument extends through the first hole or groove, wherein the second end of the instrument extends through the second hole or groove.

3. The instrument advancement device of claim 1, further comprising a plurality of other support elements disposed within the lumen of the extension tube.

4. The instrument advancement device of claim 1, wherein the wedge or the extension tube is configured to contact the support element and move the support element distally in response to movement of the wedge distally.

5. The instrument advancement device of claim 4, further comprising a tether extending between the wedge and the support element.

6. The instrument advancement device of claim 5, wherein the tether is fixed to the wedge and the support element.

7. The instrument advancement device of claim 5, wherein the support element comprises an aperture extending therethrough, wherein the tether extends through the aperture and the wedge is configured to move without moving the support element.

8. The instrument advancement device of claim 7, wherein the wedge comprises another aperture extending therethrough, wherein the tether extends through the other aperture.

9. The instrument advancement device of claim 8, wherein a distal end of the tether is distal to the support element and comprises a catch, wherein a proximal end of the tether is proximal to the wedge and comprises another catch, wherein in response to retraction of the housing in a proximal direction, the catch is configured to pull the support element proximally.

10. The instrument advancement device of claim 1, wherein the pair of opposing pinch members are disposed within the housing proximal to the wedge, further comprising another pair of opposing pinch members configured to pinch the extension tube, wherein the other pair of opposing pinch members are disposed within the housing distal to the wedge and configured to move along the extension tube with the housing, wherein in response to moving the housing proximally along the extension tube, the pair of opposing pinch members push the wedge proximally and the instrument is retracted proximally.

11. The instrument advancement device of claim 1, wherein the extension tube comprises a first lumen and a second lumen, wherein a blood collection pathway extends through the first lumen, wherein the wedge and the instrument are disposed within the second lumen.

12. An instrument advancement device, comprising:
    a housing;
    an extension tube extending through the housing;
    a wedge disposed within the housing, wherein the wedge comprises an arc-shaped channel;
    a pair of opposing pinch members configured to pinch the extension tube, wherein the pair of opposing pinch members are disposed within the housing and configured to move along the extension tube with the housing;
    an instrument extending through the arc-shaped channel, wherein a first end of the instrument is fixed, wherein in response to moving the housing distally along the extension tube, the pair of opposing pinch members push the wedge distally, wherein in response to movement of the wedge distally a first distance, a second end of the instrument is configured to advance distally a second distance, wherein the second distance is at least twice the first distance; and
    a compressible element disposed within a lumen of the extension tube distal to the wedge, wherein in response to distal movement the wedge, the wedge is configured to contact the compressible element to compress the compressible element.

13. The instrument advancement device of claim 12, wherein the compressible element comprises a spring.

14. The instrument advancement device of claim 12, wherein the compressible element is disposed between the first end of the instrument and the second end of the instrument.

15. The instrument advancement device of claim 12, wherein the first end extends through the compressible element.

16. The instrument advancement device of claim 12, wherein the second end extends through the compressible element.

17. The instrument advancement device of claim 12, further comprising another compressible element disposed within a lumen of the extension tube distal to the wedge, wherein the first end extends through the compressible element, wherein the second end extends through the other compressible element.

18. The instrument advancement device of claim 12, wherein in response to movement of the housing along the extension tube, the opposing pinch members rotate with respect to the housing and the extension tube.

19. The instrument advancement device of claim 12, wherein the housing comprises a first push tab and a second push tab.

20. The instrument advancement device of claim 12, further comprising a distal connector, wherein a distal end of the extension tube is coupled to the distal connector, wherein the distal end comprises a distal connector, wherein the distal connector comprises a central insertion feature and two lever arms disposed on opposite sides of the central insertion feature, wherein the central insertion feature comprises a luer shape, wherein a proximal end of each of the two lever arms comprises a stop protrusion.

* * * * *